United States Patent
Wendel (10) Patent No.: US 10,288,385 B2
(45) Date of Patent: *May 14, 2019

(54) CAMOUFLAGE PATTERN WITH EXTENDED INFRARED REFLECTANCE SEPARATION

(71) Applicant: International Textile Group, Inc., Greensboro, NC (US)

(72) Inventor: Dale R. Wendel, Union, SC (US)

(73) Assignee: International Textile Group, Inc., Greensboro, NC (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/594,502

(22) Filed: Jan. 12, 2015

(65) Prior Publication Data

US 2015/0192392 A1    Jul. 9, 2015

Related U.S. Application Data

(63) Continuation of application No. 12/512,768, filed on Jul. 30, 2009, now Pat. No. 8,932,965.

(Continued)

(51) Int. Cl.
*F41H 3/02* (2006.01)
*C09B 9/00* (2006.01)
(Continued)

(52) U.S. Cl.
CPC ........... *F41H 3/02* (2013.01); *A41D 13/0012* (2013.01); *C09B 9/00* (2013.01); *C09B 21/00* (2013.01);
(Continued)

(58) Field of Classification Search
USPC ..... 428/919; 135/115; 8/478, 479, 638, 642, 8/650
See application file for complete search history.

(56) References Cited

U.S. PATENT DOCUMENTS

| 2,939,200 A | 6/1960 | Ewing et al. |
| 3,558,267 A | 1/1971 | Langenfeld |

(Continued)

FOREIGN PATENT DOCUMENTS

| EP | 0 111 124 | 6/1984 |
| EP | 0 159 876 A2 | 10/1985 |

(Continued)

OTHER PUBLICATIONS

"Technology: Why SWIR? What is the value of Shortwave Infrared?", Sensors Unlimited, Inc., http://www.sensorsinc.com/whyswir.html, at least as early as Apr. 19, 2008, 21 pages.

(Continued)

*Primary Examiner* — Matthew D Matzek
(74) *Attorney, Agent, or Firm* — Dority & Manning, P.A.

(57) ABSTRACT

Fabrics containing camouflage patterns are produced from dyes wherein at least certain of the colors contained in the pattern contain a low reflectance dye. The low reflectance dye is added to one or more colors in the pattern in order to preserve the camouflage pattern when viewed through night vision goggles as relatively long wavelengths, such at wavelengths greater than 900 nm. In one embodiment, the low reflectance dye comprises a thiazine. The low reflectance dye is blended with other dyes to produce colors in the pattern. By altering the concentration of the low reflectance dye in each of the colors, the colors contained in the camouflage pattern remain separate and distinct even at relatively long wavelengths.

20 Claims, 7 Drawing Sheets

Related U.S. Application Data (60) Provisional application No. 61/084,824, filed on Jul. 30, 2008.

(51) Int. Cl.
*C09B 21/00* (2006.01)
*C09B 67/22* (2006.01)
*A41D 13/00* (2006.01)
*A41D 31/00* (2019.01)

(52) U.S. Cl.
CPC ...... *C09B 67/0033* (2013.01); *A41D 31/0011* (2013.01); *Y10T 428/2481* (2015.01); *Y10T 442/20* (2015.04); *Y10T 442/2869* (2015.04); *Y10T 442/2893* (2015.04); *Y10T 442/30* (2015.04)

(56) References Cited

U.S. PATENT DOCUMENTS

| | | | |
|---|---|---|---|
| 3,628,995 A | 12/1971 | Economy et al. | |
| 3,918,901 A | 11/1975 | Ida et al. | |
| 4,001,477 A | 1/1977 | Economy et al. | |
| 4,095,940 A | 6/1978 | Weingarten | |
| 4,198,494 A | 4/1980 | Burckel | |
| 4,495,239 A | 1/1985 | Pusch et al. | |
| 4,525,168 A | 6/1985 | Kelly | |
| 4,705,527 A | 11/1987 | Hussamy | |
| 4,710,200 A | 12/1987 | Cates et al. | |
| 4,722,735 A | 2/1988 | Brodmann | |
| 4,752,300 A | 6/1988 | Johnson | |
| 4,865,906 A | 9/1989 | Smith, Jr. | |
| 4,868,041 A | 9/1989 | Yamagishi et al. | |
| 4,869,947 A | 9/1989 | Kirayoglu | |
| 4,898,596 A | 2/1990 | Riggins et al. | |
| 4,900,613 A | 2/1990 | Green | |
| 4,911,730 A | 3/1990 | Cates et al. | |
| 4,920,000 A | 4/1990 | Green | |
| 4,958,485 A | 9/1990 | Montgomery et al. | |
| 4,981,488 A | 1/1991 | Cates et al. | |
| 4,988,746 A | 1/1991 | Tanaka et al. | |
| 4,990,368 A | 2/1991 | Johnson et al. | |
| 4,994,317 A | 2/1991 | Dugan et al. | |
| 5,025,537 A | 6/1991 | Green | |
| 5,043,202 A | 8/1991 | Knickerbocker | |
| 5,077,101 A | 12/1991 | Conway et al. | |
| 5,077,126 A | 12/1991 | Green | |
| 5,191,777 A | 3/1993 | Schnegg | |
| 5,215,545 A | 6/1993 | Cates et al. | |
| 5,275,627 A | 1/1994 | Cates et al. | |
| 5,299,602 A | 4/1994 | Barbeau et al. | |
| 5,306,312 A | 4/1994 | Riggins et al. | |
| 5,356,700 A | 10/1994 | Tanaka et al. | |
| 5,402,362 A | 3/1995 | Prosser | |
| 5,447,540 A | 9/1995 | Kobayashi et al. | |
| 5,503,904 A * | 4/1996 | Yoshinaga | G03G 21/046 428/195.1 |
| 5,560,990 A | 10/1996 | Ilg et al. | |
| 5,582,912 A | 12/1996 | McCullough, Jr. et al. | |
| 5,607,483 A | 3/1997 | Burkinshaw et al. | |
| 5,798,304 A * | 8/1998 | Clarkson | B32B 27/12 428/913 |
| 5,811,359 A | 9/1998 | Romanowski | |
| 5,842,614 A | 10/1998 | Gadoury | |
| 5,830,574 A | 11/1998 | Gadoury | |
| 5,849,648 A | 12/1998 | Kent et al. | |
| 5,858,888 A | 1/1999 | Underwood et al. | |
| 5,873,914 A | 2/1999 | Burkinshaw et al. | |
| 5,880,042 A | 3/1999 | Schuster et al. | |
| 5,885,307 A | 3/1999 | Gadoury | |
| 6,065,153 A | 5/2000 | Underwood et al. | |
| 6,132,476 A | 10/2000 | Lunsford et al. | |
| 6,192,520 B1 | 2/2001 | Underwood et al. | |
| 6,215,545 B1 | 4/2001 | Matsuyama | |
| 6,247,179 B1 | 6/2001 | Underwood et al. | |
| 6,296,023 B1 | 10/2001 | Gehrhardt et al. | |
| 6,451,070 B1 | 9/2002 | Kent et al. | |
| 6,547,835 B1 | 4/2003 | Lunsford et al. | |
| 6,576,025 B2 | 6/2003 | Lapierre | |
| 6,589,297 B2 | 7/2003 | Mach et al. | |
| 6,606,749 B2 | 8/2003 | Underwood et al. | |
| 6,607,562 B2 | 8/2003 | Ghorashi et al. | |
| 6,626,964 B1 | 9/2003 | Lunsford et al. | |
| 6,805,957 B1 | 10/2004 | Santos et al. | |
| 6,818,024 B2 | 11/2004 | Lunsford et al. | |
| 6,867,143 B1 | 3/2005 | Furukawa et al. | |
| 6,867,154 B1 | 3/2005 | Lunsford et al. | |
| 6,886,184 B2 | 5/2005 | Underwood et al. | |
| 7,008,694 B1 | 3/2006 | Frankel | |
| 7,049,252 B2 | 5/2006 | Underwood et al. | |
| 7,156,883 B2 | 1/2007 | Lovasic et al. | |
| 7,581,260 B2 | 9/2009 | Underwood et al. | |
| 7,741,233 B2 | 6/2010 | Sasser et al. | |
| 7,754,140 B2 | 7/2010 | Rajner et al. | |
| RE42,209 E | 3/2011 | Lunsford et al. | |
| 8,209,785 B2 | 7/2012 | Underwood et al. | |
| 2001/0004780 A1 | 6/2001 | Mach et al. | |
| 2003/0092341 A1 | 5/2003 | Curtis et al. | |
| 2003/0148689 A1 | 8/2003 | Lapierre | |
| 2004/0045103 A1 | 3/2004 | Lunsford et al. | |
| 2004/0209051 A1 | 10/2004 | Santos et al. | |
| 2005/0025962 A1 | 2/2005 | Zhu et al. | |
| 2005/0060820 A1 | 3/2005 | Lunsford et al. | |
| 2005/0130533 A1 | 6/2005 | Lapierre | |
| 2005/0277353 A1 | 12/2005 | Lovasic et al. | |
| 2006/0010620 A1 | 1/2006 | Krabbe et al. | |
| 2006/0154542 A1 | 7/2006 | Underwood et al. | |
| 2006/0222827 A1 | 10/2006 | Marshall et al. | |
| 2007/0072501 A1 | 3/2007 | Holcombe et al. | |
| 2007/0072502 A1 | 3/2007 | Underwood et al. | |
| 2008/0038973 A1 | 2/2008 | Sasser et al. | |
| 2008/0057807 A1 | 3/2008 | Tutterow et al. | |
| 2008/0102724 A1 | 5/2008 | Frankel | |
| 2008/0134407 A1 | 6/2008 | Winterhalter et al. | |
| 2008/0153372 A1 | 6/2008 | Truesdale et al. | |
| 2008/0242175 A1 | 10/2008 | Narayanan et al. | |
| 2009/0313740 A1 | 12/2009 | Santos et al. | |
| 2010/0112312 A1 | 5/2010 | Tutterow et al. | |
| 2010/0330351 A1 | 12/2010 | Crnoja-Cosic et al. | |
| 2011/0023206 A1 | 2/2011 | Dunn et al. | |
| 2011/0027548 A1 | 2/2011 | Nusser et al. | |
| 2011/0100547 A1 | 5/2011 | Kelsey et al. | |
| 2011/0191949 A1 | 8/2011 | Underwood et al. | |
| 2011/0281097 A1 | 11/2011 | Li et al. | |
| 2012/0183747 A1 | 7/2012 | Bader et al. | |

FOREIGN PATENT DOCUMENTS

| | | |
|---|---|---|
| EP | 0 228 026 A2 | 7/1987 |
| EP | 0 237 451 A1 | 9/1987 |
| EP | 0 314 244 A2 | 5/1989 |
| EP | 0 330 163 A2 | 8/1989 |
| EP | 0 385 024 A1 | 9/1990 |
| EP | 0 432 100 A2 | 6/1991 |
| EP | 0 487 568 A1 | 6/1992 |
| EP | 0 557 734 A1 | 9/1993 |
| EP | 0 875 620 A1 | 11/1998 |
| GB | 2001417 | 1/1979 |
| GB | 2 332 001 | 6/1999 |
| JP | 63196741 | 8/1988 |
| JP | 2182936 | 7/1990 |
| JP | 2221432 | 9/1990 |
| JP | 4263646 | 9/1992 |
| JP | 8226031 | 9/1996 |
| JP | 9296335 | 11/1997 |
| JP | H09-291463 | 11/1997 |
| JP | 10060787 | 3/1998 |
| WO | WO 90/06229 A1 | 6/1990 |
| WO | WO 91/02837 A1 | 3/1991 |
| WO | WO 93/19241 A1 | 9/1993 |
| WO | WO 94/25665 A1 | 11/1994 |
| WO | WO 98/12373 A1 | 3/1998 |
| WO | WO 98/54399 A1 | 12/1998 |

(56) References Cited

FOREIGN PATENT DOCUMENTS

| WO | WO 99/35315 A1 | 7/1999 |
|---|---|---|
| WO | WO 2009/012266 A2 | 1/2009 |
| WO | WO 2009/012266 A9 | 1/2009 |

OTHER PUBLICATIONS

"Anaerobic Treatment of Textile Wastewater Containing Acid Dyes", Thesis submitted by Wijetunga Somasiri to Southern Yangtze University, Peoples Republic of China, Mar. 2006, 40 pages.

"Advances in Military Protective Clothing Materials", presentation by the U.S. Dept. of the Army, Thomas H. Tassinari and Laurance Coffin, not dated, 16 pages.

"Aramid fibres", J.E. McIntyre, Rev. Prop. Coloration, vol. 25, 1995, pp. 44-56.

"Clothing for Work and Protection", R. Jeffries, Lenzinger Berichte, Aug. 1989, pp. 25-33.

"Demand Heats Up", Doug Jackson, Safety & Protective Fabrics, Sep. 1992, pp. 32-35.

"Flame Retardant Viscose Rayon Containing a Pyrophosphate", Rainer Wolf, Ind. Eng. Chem, Prod. Res. Dev., 1981, vol. 20, pp. 413-420.

"In the heat of combat, Flame-Resistant, Protective Apparel of NOMEX gives you a fighting chance", DuPont NOMEX Brochure, 1996, 8 pages.

"Measuring the Effects of Intense Heat and Dynamic Mechanical Forces on Thermal Protective Fabrics", Geshury et al., High-Tech Fibrous Materials, ACS Symposium Series, American Chemical Society, 1991, pp. 278-292.

DuPont NOMEX IIIA brochure, 1994, 5 pages.

DuPont NOMEX Laundering Guide, 1997, 22 pages.

Technical Guide for NOMEX Brand Fiber, 2001, 40 pages.

"Novel Approach to Soldier Flame Protection" Presentation by U.S. Army Natick Soldier Center, Winterhalter and Martin, 2011, 22 pages.

Novel Polymer Solutions, http://www.novelpolymers.co.uk, at least as early as Apr. 12, 2011, 2 pages.

"Novel Approach to Soldier Flame Protection", Winterhalter et al., Journal of ASTM International, Feb. 2005, Fol. 2, No. 2, pp. 227-234.

DuPont KARVIN brochure, not dated, 4 pages.

"Printing Technology for Aramid Fabrics", Hodge et al., High-Tech Fibrous Materials, ACS Symposium Series, American Chemical Society, 1991, pp. 270-276.

"Properties and Processing Guidelines for Lenzing FR", not dated, 21 pages.

"Protective Clothing of DuPont NOMEX and Heat Stress", brochure, 2000, 2 pages.

"The Dyeing, Finishing and Performance of Fabrics for Military Uniforms", John V. Morris, Rev. Prog. Coloration, vol. 11, 1981, pp. 9-18.

TL 8415-0235, 2008, 21 pages.

"Dyeing and Finishing of KARVIN", Sep. 1982, 7 pages.

"The Processing of KARVIN in Modified Cotton Spinning and in Weaving Mills", Sep. 1982, 6 pages.

"Yarns, Fabrics and Garments made with KARVIN", Sep. 1982, 13 pages.

Burkinshaw S.M. et al., Infrared Camouflage, 1996, Department of Colour Chemistry and Dyeing, The University of Lees, vol. 26, pp. 47-52.

Dyeing, 1999, Encyclopedia of Polymer Science and Technology, John Wiley and Sons, Inc. $4^{th}$ Edition, pp. 1, 24-25.

Ramsley, A.O., Modern Counter-Surveillance in Combat Clothing, Nov. 6, 1970, U.S. Army Natick Laboratories, pp. 1-12.

Zhang, H. et al., Near-Infrared Green Camouflage of Cotton Fabrics Using Vat Dyes, Nov. 15, 2007, Journal of the Textile Institute, 99:1 pp. 83-88.

Gupta, K. K. et al., Camouflage in the Non-Visible Region, Jul. 2001, Journal of Industrial Textiles, vol. 31, pp. 27-42.

\* cited by examiner

CAMOUFLAGE PATTERN WITH EXTENDED INFRARED REFLECTANCE SEPARATION

RELATED APPLICATIONS

The present application is based upon and claims priority to U.S. patent application Ser. No. 12/512,768, filed on Jul. 30, 2009, and U.S. Provisional Patent Application No. 61/084,824, filed on Jul. 30, 2008.

BACKGROUND

Various different clothing items, such as pants, shirts, coats, hats, and the like are printed with camouflage patterns. The camouflage patterns are designed so that the wearer of the clothing article remains hard to detect visually in a particular environment. Camouflaged clothing articles are used regularly by hunters, outdoorsmen, and the military.

Military personnel, for instance, are typically issued camouflaged pattered garments known at battle dress uniforms. The camouflage pattern appearing on the garments typically consists of 3 to 8 colors chosen specifically to blend into a particular environment. For instance, camouflage patterns have been designed for desert, woodland and jungle environments as well as urban environments, and the like. Camouflage patterns have become more and more sophisticated in the recent past. For instance, U.S. Pat. No. 6,805,957, which is incorporated herein by reference, discloses a camouflage pattern system that is intended to provide concealment properties in both the human visible light range and the near infrared range. The camouflage pattern, for instance, may include at least 4 colorings using dyes that in combination produce a range of reflectance values similar to that of the background environment that the individual person will be wearing the garment in. The camouflage pattern system disclosed in the '957 patent includes a macro pattern that is disruptive of the wearer's shape and a micro pattern having sharp edge units of a size capable of blending the wearer into its background.

Although many camouflaged garments are well suited to providing camouflaged properties to the wearer in the visible region of light and to some extent in the near infrared region, many camouflage patterns lose their effectiveness at longer wavelengths of light. For example, night vision goggles detect reflectances in the infrared wavelength range and produce an image that can be visibly seen by the user. More specifically, night vision goggles sense and amplify reflective visible starlight, or other ambient light, in image intensification tubes. In the past, most night vision goggles operated in the near infrared wavelength range of less than 900 nm.

Recently, however, various improvements have been made in night vision detection equipment allowing the goggles to operate at longer wavelengths. At longer wavelengths, such as wavelengths greater than 900 nm, many camouflage garments begin to lose their camouflage properties. In particular, at longer wavelengths, the colors contained in the camouflage patter exhibit the same reflectance characteristics. Thus, when a camouflaged garment is viewed through night vision goggles that operate at longer wavelengths, the colors of the camouflage pattern begin to reflect ambient light back at similar intensities thereby presenting an object as a single intensity silhouette and making the garment wearer easily detectable.

In view of the above, a need currently exists for a fabric and garment containing a camouflage pattern that retains its camouflage light reflectance characteristics even when viewed at wavelengths greater than 900 nm. In particular, a need exists for a method and system of maintaining color or reflectance separation in a camouflage pattern at relatively long wavelengths in the infrared range.

SUMMARY

In general, the present disclosure is directed to a fabric product containing a camouflage pattern that maintains color separation at relatively long wavelengths. The present disclosure is also directed to various clothing articles and garments made from the fabric product.

More particularly, fabrics made in accordance with the present disclosure include a camouflage pattern made from multiple colors. The colors contained in the pattern are formulated so that the colors have different light reflectance properties at relatively long wavelengths. The colors are formulated, in one embodiment, using a dye that exhibits lower reflectance characteristics than the other dyes used in the pattern. The low reflectance dye is combined with other dyes to produce one or more of the colors in the pattern. The lower reflectance dye is incorporated into the colors so that the colors exhibit different reflectance intensities at relatively long wavelengths, such as at wavelengths greater than about 900 nm.

In one embodiment, for instance, the fabric product of the present disclosure comprises a fabric substrate that includes a camouflage pattern visible from at least one side of the fabric substrate. The camouflage pattern comprises at least a first color and a second color. The first and second colors in the camouflage pattern comprise a plurality of dyes, such as vat dyes, blended together. At least one of the colors contains a low reflectance dye that has a reflectance of less than about 70 percent at 1500 nm. The dye is present in the first color so that the first color has a reflectance that is at least 5 percent different than the reflectance of the second color at 1500 nm. For instance, the first color may have a reflectance that is at least about 7 percent different, such at least about 10 percent different than the second color at a wavelength of 1500 nm. In fact, the difference in reflectance can exist over a relatively broad range of wavelengths. For instance, the difference in reflectance between the first color and the second color may be greater than about 5 percent at a range of wavelengths from about 600 nm to about 1600 nm.

As described above, each of the colors used to produce the camouflage pattern can be created using a blend of vat dyes. In this regard, the present disclosure is particularly well suited to applying camouflaged patterns to fabric substrates containing cellulosic fibers. For instance, the fabric substrate may comprise a woven or nonwoven fabric containing cellulose fibers either alone or in combination with synthetic fibers, such as polyamide fibers and/or polyester fibers. The cellulose fibers may comprise, for instance, cotton fibers, rayon fibers, and the like.

In one embodiment, the fabric substrate may comprise a fire retardant fabric. In this embodiment, for instance, the fabric substrate may be made from fire retardant rayon fibers in combination with aramid fibers, such as para-aramid fibers.

The fabric substrate can have any suitable nowoven construction, woven weave or basis weight. For instance, the fabric substrate may be made from a woven fabric having a twill weave or a rip-stop weave. The fabric can have a basis weight from about 5 ounces per square yard to about 8 ounces per square yard.

The low reflectance dye used to maintain color separation at longer wavelengths can comprise any suitable dye that is compatible with vat dyes. For instance, in one embodiment, the low reflectance dye may comprise a vat dye. For example, low reflectance dyes that may be used in the present disclosure include thiazines. One particular example of a low reflectance dye is C.I. vat black dye 19.

When the camouflage pattern of the present disclosure is created from colors made from vat dyes, the camouflage pattern can have color fastness characteristics well suited for use in military applications. For instance, in one embodiment, the differences in reflectance between the different colors of the camouflage pattern can remain intact even after the garment has been laundered 20 laundry cycles.

Other features and aspects of the present disclosure are discussed in greater detail below.

BRIEF DESCRIPTION OF THE DRAWINGS

The present disclosure may be better understood with reference to the following figure.

DETAILED DESCRIPTION

It is to be understood by one of ordinary skill in the art that the present discussion is a description of exemplary embodiments only, and is not intended as limiting the broader aspects of the present disclosure.

Various different camouflage patterns exist that are well suited for providing protective concealment in different environments. The camouflage patterns have been designed to disguise an animate or inanimate subject in plain sight so as to conceal the subject from something or someone.

Camouflage patterns are used, for instance, by hunters and other sportsman. Camouflage patterns are also relied on by the military in order to conceal vehicles or other objects or in order to protect military personnel in combat areas. The U.S. military, for instance, has developed various different sophisticated camouflage patterns for use in different environments. For example, camouflage patterns have been developed and created for use in woodland areas, desert areas, urban areas, and the like. The camouflage patterns created by the military are well suited for concealing people and objects in visible light. The patterns have also been designed to provide some protection in the near infrared wavelength range, such as at wavelengths up to about 900 nm. In the past, these designs were adequate for breaking up a soldier's silhouette using existing night vision equipment.

Recently, however, new night vision equipment has been developed that operates at wavelengths greater than 900 nm. At longer wavelengths, the colors in the existing camouflage patterns for the U.S. Military have a tendency to merge together. In particular, at longer wavelengths, the colors generally have the same reflectance characteristics making the camouflage pattern reflect ambient light at a single intensity. Thus, when viewed using night vision equipment at longer wavelengths, the camouflage patterns provide little to no concealment and instead present a single, solid silhouette to the viewer.

In this regard, the present disclosure is directed to a process and system for producing camouflage patterns on fabrics that are produced with colors that maintain their reflectance separation even at relatively long wavelengths, such as at wavelengths greater than 900 nm. More particularly, the present inventor discovered that a certain series of dyes exhibit a reflectance profile that is lower at longer wavelengths in relation to other dyes of the same class. The lower reflectance dye can be combined with other dyes to create colors that may be used to produce a camouflage pattern. A lower reflectance dye in accordance with the present disclosure, for instance, may be contained in one or more colors used to form a camouflage pattern. The amount of the lower reflectance dye incorporated into each color can be varied so that the colors display different reflectance intensities at longer wavelengths. Through this methodology, camouflage patterns can be produced wherein the colors in the pattern can have reflectance differences of greater than about 5 percent, such as greater than about 7 percent, such as even greater than about 10 percent at relatively long wavelengths, such at wavelengths from 900 nm to about 1600 nm or even longer.

In one embodiment, the low reflectance dye may comprise a particular type of vat dye that may be combined with other vat dyes to produce colors for use in producing a camouflage pattern. Vat dyes are water-insoluble dyes which have been conventionally used in the past for dyeing cellulose fibers. Vat dyes are typically applied to fabric substrates in a pigmented form and then reduced and oxidized on the fabric to produce their final shade and fastness characteristics. Vat dyes include anthraquinones and indigoides.

Almost all vat dyes have the same or similar reflectances at relatively longer wavelengths, such at wavelengths greater than 900 nm. The present inventor discovered, however, that a certain type of vat dye exhibits a different and lower reflectance than almost all of the other vat dyes. For example, in one embodiment, the low reflectance dye used in accordance with the present disclosure may comprise a thiazine. Thiazines are organic compounds whose structure contains a ring of four carbon atoms, one nitrogen atom, and one sulfur atom. One particular example of a low reflectance dye is CI vat black dye 19. CI vat black dye 19, for instance, is commercially available from Dystar L.P. of Charlotte, N.C. under the trade name INDANTHREN GREY NC. INDANTHERN GREY NC, for instance, contains CI vat black 19 dye and glycerol. The glycerol is present in amounts less than 8 percent by weight.

CI vat black 19 dye has reflectance properties as shown in the table below. As used herein, the percent reflectance of an individual dye is measured as applied to a fabric at a concentration of 25 grams per kilogram of print paste. The print paste is comprised of 95 percent by weight water, 3 percent by weight acrylic acid thickener and 2 percent by weight lubricant. The lubricant comprises 2-ethyl hexanol. The acrylic acid thickener on the other hand comprises Lyoprint PT-RV, a product of Huntsman International LLC The fabric against which the percent reflectance is measured is a 50/50 polyamide and cotton fabric. The polyamide used is nylon type 6,6 manufactured by Dupont as type 420, with a denier per filament of between 1.6 and 1.8. The cotton fibers used are comb cotton. The fabric has a basis weight of about 6.5 ounces per square yard and is produced with a left-hand twill weave.

In order to test for reflectance, the dye is printed onto a fabric sample and reflectance measurements of the fabric are made using a spectrophotometer. The spectrophotometer used was model JASCO V-570 UV/VIS/NIR manufactured by Jasco Corporation. The reflectance characteristics of CI vat black 19 dye are as follows:

| Wavelength (nm) | Percent Reflectance at 25.0 g/kg |
|---|---|
| 1800 | 60.8 |
| 1750 | 57.6 |
| 1700 | 60.6 |
| 1650 | 67.7 |
| 1600 | 60.3 |
| 1550 | 57.2 |
| 1500 | 55.9 |
| 1450 | 58.7 |
| 1400 | 64.5 |
| 1350 | 68.9 |
| 1300 | 66.0 |
| 1250 | 59.9 |
| 1200 | 52.5 |
| 1150 | 49.8 |
| 1100 | 46.3 |
| 1050 | 44.5 |
| 1000 | 42.8 |
| 950 | 40.5 |
| 900 | 38.0 |
| 850 | 33.8 |
| 800 | 29.0 |
| 750 | 25.6 |
| 700 | 24.2 |
| 650 | 23.7 |
| 600 | 24.6 |
| 550 | 26.2 |
| 500 | 25.8 |
| 450 | 26.0 |
| 400 | 23.4 |

As shown above, CI vat black 19 dye at a concentration of 25 g/kg has a reflectance at 1500 nanometers of 55.9 percent. Almost all other vat dyes, on the other hand, display a reflectance at the same concentration of greater than 70 percent. This difference in reflectance at longer wavelengths allows for the production of colors which display different reflectance intensities at wavelengths greater than 900 nm. For instance, when producing a camouflage pattern in accordance with the present disclosure, a plurality of vat dyes may be blended together to produce the colors to be used in the camouflage pattern. In most applications, for instance, a 2 to 7 color pattern, as many as 3 to 5 dyes may be blended together to produce each color. In accordance with the present disclosure, CI vat black dye 19 may be contained in one or more of the dye blends to produce the colors. By varying the relative amount of the CI vat black 19 dye concentration in each color, the individual colors can be made to reflect light at different intensities at longer wavelengths. Thus, camouflage patterns made in accordance with the present disclosure have reflectance separation and effectiveness at wavelengths greater than 900 nm, such as from 900 nm to 1800 nm or even longer.

In addition to this CI vat black 19 dye, it should be understood that other low reflectance dyes may be used in accordance with the present disclosure. For instance, other low reflectance dyes may comprise other thiazines. Low reflectance dyes that may be used can generally have a reflectance of less than about 70 percent at 1500 nm (when applied to a fabric substrate as described above at a concentration of 25 g/kg). For example, particular low reflectance dyes well suited for use in the present disclosure include other vat dyes that have a reflectance of less than about 65 percent at 1500 nm, such as less than about 60 percent at 1500 nm.

Camouflage patterns made in accordance with the present disclosure offer various advantages and benefits in addition to providing concealment when viewed through instruments, such as night vision goggles, that operate at longer wavelengths. For example, because the color separation of the camouflage pattern at longer wavelengths can be accomplished using only vat dyes, conventional and well proven fabrics can be used when constructing garments. For example, the U.S. military has found that preferred fabrics for producing battle dress uniforms are made from mixtures of cellulose fibers and polyamide fibers. A 50/50 blend of polyamide and cotton, for instance, was developed by the U.S. military and selected based on its durability and comfort properties. Such fabrics are particularly compatible with vat dyes. Thus, improved camouflage patterns in accordance with the present disclosure may be used for military applications using the very same fabrics used in the past.

In fact, CI vat black 19 dye as described above may be used to produce camouflage patterns that provide a good visual match to colors used in existing camouflage patters. Further, since, in one embodiment, only vat dyes are used in conjunction with fabrics containing cellulose fibers, all the colorfastness requirements as specified by the military can be met. More particularly, camouflage fabrics can be produced in accordance with the present disclosure that meet the military specifications as designated as MIL-C-44436A Class 8, MIL-PRF-MCCUUC Type 1 and Type 2 and Class 1 and Class 2, and MIL-C-44031D.

For example, camouflage fabrics made in accordance with the present disclosure can maintain color reflectance separation at wavelengths greater than 900 nm, such as greater than 1200 nm even after the fabrics have been subjected to 20 laundry cycles. As used herein, a laundry cycle as defined by the military specifications identified above or according to the following procedure.

Laundry Cycle

Laundering is preferably performed in a KENMORE automatic washer or equivalent thereof, followed by drying in a KENMORE automatic dryer or equivalent thereof. The following laundering test is used to determine the fabric's ability to withstand laundering.

1. 8"×10" test specimens are combined with load fabrics (hemmed pieces of cotton sheeting or 50:50 fabric sheets having a size of 36"×36") to give a total dry load of 4 pounds.

2. The dials on the washer are set as follows:
Water Level High Wash Cycle Normal, 12 minutes Temperature Warm Wash, 105° F.; Cold Rinse
The test pieces and dummy load are placed in the washer and the machine is started. One ounce of TIDE (Proctor & Gamble) detergent is added while the washer is filling with soft water. If the water hardness is greater than 5 ppm, CALGON water softener (Nalco) in the amount specified by the manufacturer is added to soften the water.

3. After the washing is complete, the wet fabric including the dummy load is placed in the automatic dryer. The dryer temperature dial is set to the proper point under high heat to give a maximum vent temperature of from about 155° F. to about 160° F. The time dial is set for "Normal Cycle" for 45 minutes. The machine is started and drying is allowed to continue until the cycle is complete. The above represents one laundry cycle.

4. The fabrics are then rewashed and redried until the desired number of cycles have been completed. Optionally, the test fabrics can be pressed with a hand iron, or the equivalent, at 280° F. to about 320° F. for 30 seconds on each side with the face side pressed last.

In the past, those skilled in the art have proposed incorporating different additives into the colors that are used to produce camouflage patterns in order to maintain reflectance separations at wavelengths outside of the visual range. For instance, in one embodiment, others have proposed adding pigments to one or more of the colors in the camouflage pattern so that the colors have different reflectances at desired wavelength ranges. Problems have been experienced in the past, however, in maintaining the required colorfastness since the pigments have a tendency to wash out of the fabrics. Thus, another advantage to the present disclosure is the ability to produce colors having different reflectances at relatively long wavelength ranges without having to use pigments or other auxiliary chemicals.

Camouflage patterns made in accordance with the present disclosure can be applied to any suitable fabric substrate, woven or nonwoven. As described above, in one embodiment, the camouflage patterns are particularly well suited for use with fabrics containing cellulosic fibers. Thus, in one embodiment, the fabric substrate used in the present disclosure may comprise a fabric containing cellulosic fibers such as cotton fibers, lyocell fibers, rayon fibers, acetate fibers, triacetate fibers, pulp fibers, and the like. Cellulose fibers may be present in the fabric either alone or in combination with synthetic fibers. Synthetic fibers that may be used in combination with the cellulose fibers to produce yarns include polyamide fibers or polyester fibers.

When synthetic fibers are present in the fabric, the synthetic fibers may be solution dyed using any suitable pigment. For instance, aramid fibers including para-aramid fibers and meta-aramid fibers, and polyamide fibers present within the fabric may be solution dyed and then incorporated into a fabric. The fabric can then be printed using a camouflage pattern in accordance with the present disclosure.

In one particular embodiment, for instance, camouflage patterns made in accordance with the present disclosure are applied to a fabric made from yarns or nonwoven material containing 50 percent by weight cotton fibers and 50 percent by weight nylon fibers. The fabric can be nonwoven or have a twill weave, rip-stop weave, or any other suitable weave. The basis weight of the fabric can generally be from about 6 ounces per square yard to about 8 ounces per square yard in one embodiment. Other basis weights may be used, however, depending upon the particular application.

In still another embodiment, the fabric substrate may be fire retardant, such as the fabrics described in U.S. Pat. No. 6,867,154, which is incorporated herein by reference. For instance, in one embodiment, the fabric substrate may comprise a woven fabric containing cellulosic fibers blended with flame resistant fibers, such as aramid fibers. Aramid fibers may include para-aramid fibers, meta-aramid fibers, and the like. The flame resistant fibers may be combined with cellulosic fibers that have been treated so as to be flame resistant. For instance, the cellulose fibers may be treated with one or more flame retardants, such as phosphorus compounds or antimony compounds. This invention also pertains to nonwoven items produced from the same combination of fibers.

In one particular embodiment, for instance, the fabric substrate may comprise a flame resistant fabric containing 65 percent by weight fire resistant rayon fibers, 25 percent by weight para-aramid fibers, and 10 percent by weight nylon fibers. The flame resistant fabric can have a rip-stop or twill weave and can have a basis weight of from about 6 ounces per square yard to about 8 ounces per square yard.

Camouflage patterns made in accordance with the present disclosure and applied to fabric substrates as described above generally contain one and usually at least 2 colors. For instance, the camouflage pattern may contain from about 3 to about 8 colors, such as from about 3 to about 5 colors.

Each color in the camouflage pattern can be made by blending together 2 or more dyes, such as vat dyes. In accordance with the present disclosure, at least one color in the camouflage pattern contains a low reflectance dye as described above. In one embodiment, for instance, the low reflectance dye can be contained in multiple colors at different concentrations within a single camouflage pattern. In this manner, each of the colors in the pattern may display a different reflectance at relatively long wavelengths, such as wavelengths greater than about 900 nm, such as wavelengths greater than about 1200 nm.

It should be understood, however, that a fabric can be produced in accordance with the present disclosure that has one solid shade. The solid shade may be produced so as to have a particular reflectance at a relatively long wavelength.

In an alternative embodiment, a camouflage pattern may be produced that contains 3 colors. The colors may include a light color, a midrange color, and a dark color. The low reflectance dye, such as CI vat black 19 dye, may be used to produce the dark color and the midrange color. The low reflectance dye may be added to the dark color at a concentration greater than at which the dye is added to the midrange color. In this manner, a camouflage pattern is produced containing 3 colors that each have a different reflectance profile and maintain color separation at the longer wavelengths.

In other embodiments, the camouflage pattern may contain 4 to 8 colors. In these embodiments, the low reflectance dye may be used in creating 2 to 7 of the colors. Of particular advantage, many different vat dyes are available for blending with the low reflectance dye in order to produce the desired color. Other vat dyes that may be combined with the low reflectance dye include, for instance, without limitation CI vat yellow 4, CI vat yellow 33, CI vat orange 1, CI vat orange 7, CI vat orange 11, CI vat orange 15, CI vat blue 5, CI vat blue 19, CI vat blue 66, CI vat green 1, CI vat green 3, CI vat green 9, CI vat green 13, CI vat brown 1, CI vat brown 3, CI vat brown 57, CI vat black 7, CI vat black 8, CI vat black 9, CI vat black 25, CI vat black 27, CI sulfur black 1, CI sulfur black 6, CI sulfur black 7, CI solvent blue 122, CI solvent blue 132, CI solvent blue 104, CI solvent blue 45, CI solvent yellow 83, CI solvent yellow 147, CI solvent brown 53, CI disperse violet 57 and the like.

The amount or concentration of the low reflectance dye that is contained in the different colors to produce a camouflage pattern in accordance with the present disclosure can vary depending upon the particular application and the desired result. In general, the low reflectance dye can be used so that the colors have a reflectance difference of greater than about 5 percent at a wavelength of 1500 nm. For instance, at least two colors in the pattern can have a reflectance difference of at least 7 percent, such as at least 10 percent, at a wavelength of 1500 nm. The difference in reflectance may also occur over a wavelength range. For instance, the colors of the pattern may have a reflectance difference of greater than about 5 percent, such as greater than about 7 percent over a range of wavelengths from about 600 nm to about 1800 nm.

In formulating the colors used for the camouflage pattern and prior to printing the colors onto a fabric, the dyes are combined with a clear printing paste. The printing paste, for instance, may contain water, a thickener, and a lubricant. For instance, in one embodiment, the print past may contain 95 percent by weight water, 3 percent by weight acrylic acid thickener, and 2 percent by weight 2-ethyl hexanol lubricant.

In addition to using a synthetic thickener, such as a polyacrylic acid, it should be understood that various other thickeners may be used. For instance, natural thickeners may also be used to produce the print paste. Natural thickeners may include natural gums, such as guar gum and the like. Other thickeners may include modified celluloses, such as carboxymethyl cellulose and/or starches. The amount of thickener present in the print paste can vary depending upon the particular application. As described above, in one embodiment, the thickeners may be present in an amount of about 3 percent by weight. In other embodiments, however, the thickener may be present in an amount from about 2 percent to about 10 percent by weight.

Once the dyes are blended together to form the colors, the blended dyes can be applied to a fabric substrate using any suitable printing process. For instance, in one embodiment, the camouflage patterns can be applied to a fabric substrate using a rotary screen printing method. The dyes are then developed using the Flash Ageing process on a separate machine called a Flash Ager. In one embodiment, for instance, the fabric is padded through a solution containing an alkali and reducing agent along with corn starch. A steamer operating at above 90 C drives the reaction that converts the dyes into their reduced or leuco state. Once converted into a reduced form, the vat dyes become water soluble. After the dyes are reduced, the fabric goes through a rinse section before entering an oxidation step. For instance, the fabric can be contacted with an aqueous solution containing an oxidizing agent, such as a potassium iodide/acetic mixture. In another embodiment, hydrogen peroxide may be used as the oxidizing agent. Once oxidized, the dyes convert into their insoluble form and remain well affixed to the fabric. The final step is to wash the fabric at 150 F and dry. The Flash Ageing process is well documented in the industry and is quite familiar to those of ordinary skill in the industry.

Figure 1:
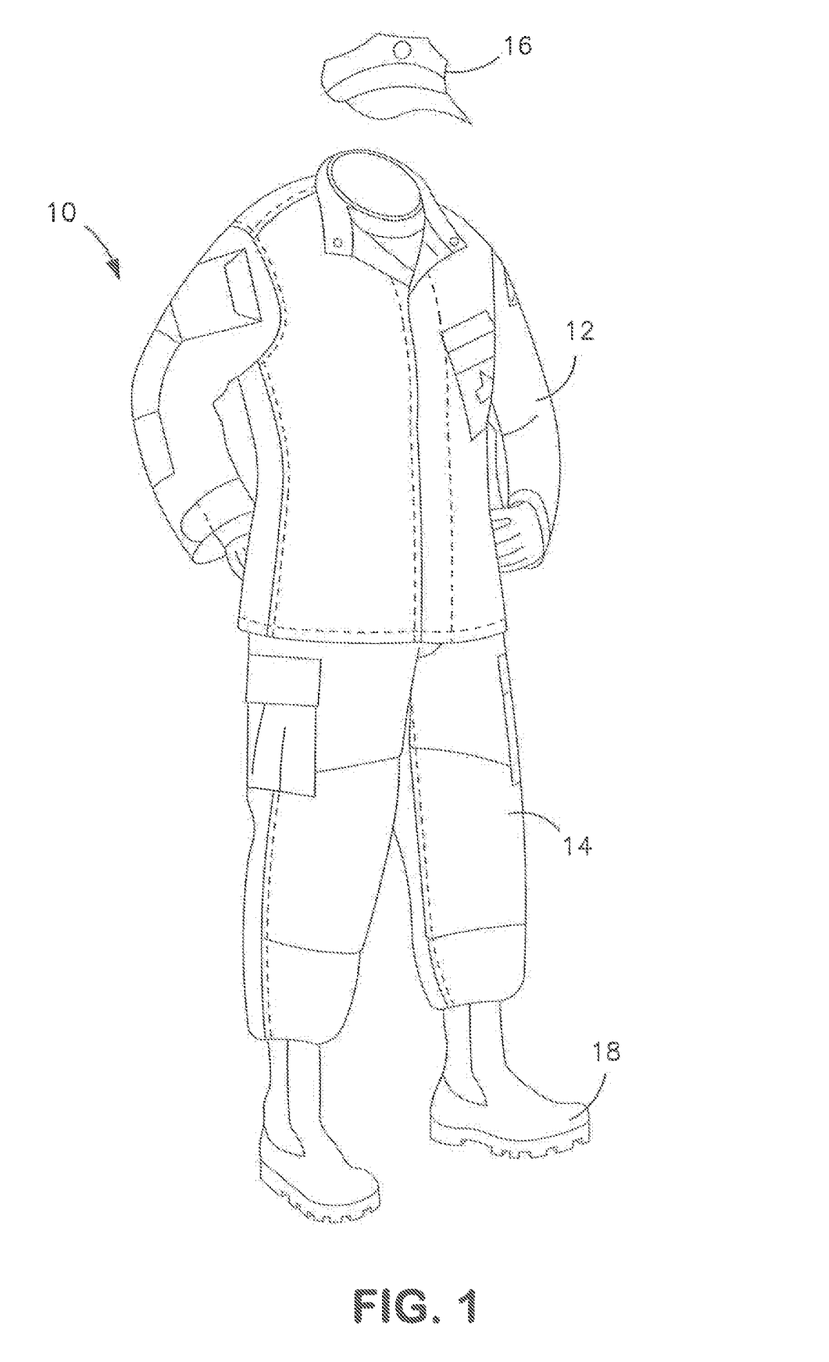
FIG. 1 is a perspective view of one embodiment of a battle dress uniform that may include a camouflage pattern in accordance with the present disclosure.

Once the camouflage pattern has been applied to the fabric, the fabric can then be used to produce any suitable clothing item, tarp, or any other suitable object. For instance, in one embodiment, as shown in FIG. 1, the fabric can be used to produce a battle dress uniform 10. As shown, the battle dress uniform 10 can include a shirt or jacket 12, trousers 14, a hat 16, and boots 18. The fabric containing the camouflage pattern can be used to produce any of these clothing articles.

The present disclosure may be better understood with reference to the following examples.

EXAMPLE 1

The following example was conducted in order to demonstrate some of the advantages and benefits of using a low reflectance dye in accordance with the present disclosure.

Two different fabric samples were rotary screen printed with a camouflage pattern. In this example, the camouflage pattern was similar to the camouflage pattern used on U.S. Army combat uniforms. The camouflage pattern contained three colors: foliage green, urban grey and desert sand. The fabric was made with yarns containing 50 percent by weight nylon fibers and 50 percent by weight cotton fibers. The fabric had a 2×1 left-hand twill weave. The fabric had a basis weight of about 6.5 ounces per square yard. Two different camouflage patterns were printed on the fabric. The first camouflage pattern comprised the control sample. In the control sample, the three colors identified above were all produced by blending vat dyes together. In the control sample, however, a low reflectance dye in accordance with the present disclosure was not used.

In producing the second fabric sample, on the other hand, a low reflectance dye was combined with other vat dyes to produce the foliage green color and the urban grey color. The low reflectance dye used was CI vat black 19 dye obtained from Dystar LP under the trade name IDANTHREN GREY NC. More particularly, the follow vat dyes were blended in the following concentrations to produce the colors contained in the camouflage pattern:

Foliage Green
18.0 g/Kg Indanthren Grey NC (Dystar LP)
5.8 g/Kg Patcovat Olive TPC (C.H. Patrick & Co., Inc.)
2.0 g/Kg Patcovat Blue PBR (C.H. Patrick & Co., Inc.)
Urban Grey
8.78 g/Kg Indanthren Grey NC (Dystar LP)
2.0 g/Kg Roycevat Olive R (Passaic Color & Chemical)
0.508 g/Kg Indanthren Blue TCLF (Dystar LP)
Desert Sand
0.135 g/Kg Roycevat Yellow CM (Passaic Color & Chemical)
0.324 g/Kg Indanthren Brown HRR (Dystar LP)
0.495 g/Kg Indanthren Blue TCLF (Dystar LP)
0.485 g/Kg Patcovat Olive TPC (C.H. Patrick & Co., Inc.)

In forming the above colors, the vat dyes were combined with a clear paste. The past contained 95 percent by weight water, 3 percent by weight of an acrylic acid thickened, and 2 percent by weight of a lubricant which comprised 2-ethyl hexanol.

After the two fabric samples were produced, the reflectance of each color in the camouflage pattern was measured at wavelengths from 400 nm to 1800 nm. The results of the control are included as FIG. 2. As shown, at approximately a wavelength of 1150 nm, the urban grey and foliage green color begin to convert and have the same reflectance. At a wavelength of 1400 nm, all three colors contained in the camouflage pattern begin to converge.

Figure 3:
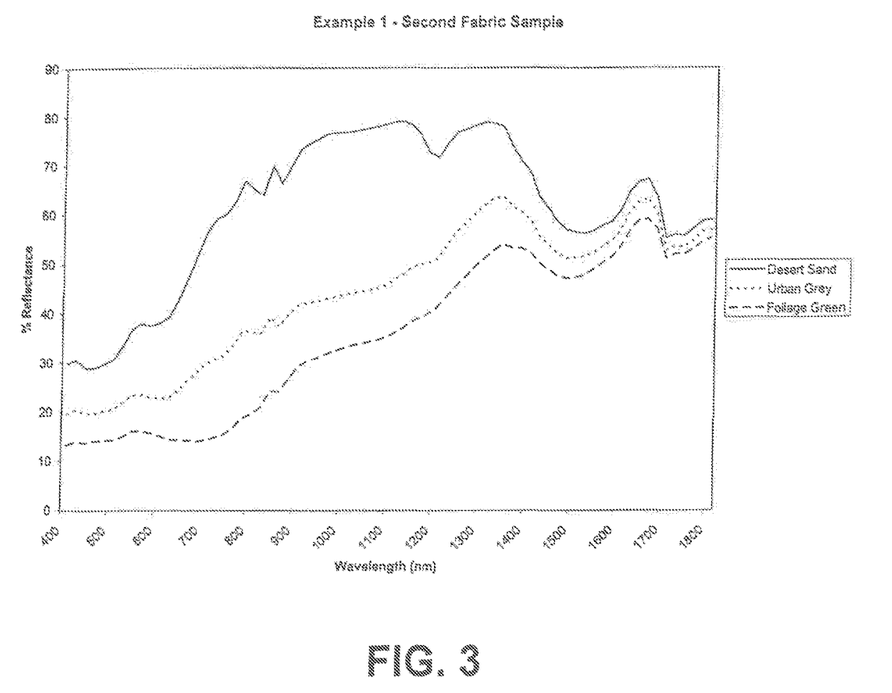

The reflectance measurements of the second fabric sample are illustrated in FIG. 3 and are tabulated in the table below.

| Reflectance Measurements of Second Fabric Sample | | | |
| --- | --- | --- | --- |
| Wavelength (nm) | Reflectance of Desert Sand (%) | Reflectance of Urban Grey (%) | Reflectance of Foliage Green (%) |
| 400 | 29.78 | 19.59 | 13.19 |
| 500 | 30.7 | 20.56 | 14.18 |
| 600 | 38.17 | 22.89 | 15.08 |
| 700 | 56.56 | 29.73 | 14.17 |
| 800 | 65.18 | 36.22 | 19.5 |
| 900 | 73.35 | 41.71 | 29.21 |
| 1000 | 76.86 | 43.93 | 33.1 |
| 1100 | 78.91 | 46.44 | 35.69 |
| 1200 | 71.66 | 51.08 | 41.26 |
| 1300 | 78.93 | 61.92 | 51.09 |
| 1400 | 68.36 | 58.88 | 52.54 |
| 1500 | 56.52 | 51.41 | 47.3 |
| 1600 | 61.08 | 57.03 | 53.75 |
| 1700 | 55.39 | 52.89 | 51.26 |
| 1800 | 58.99 | 56.84 | 55.32 |

Figure 2:
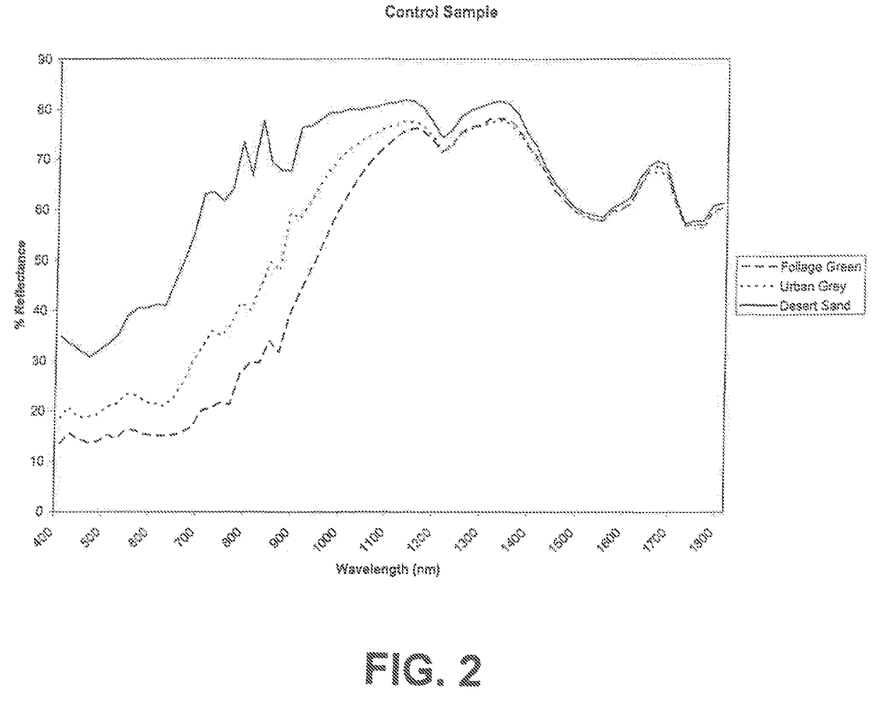
FIGS. 2-7 are graphical representations of the results obtained in the examples.

As shown in FIG. 3, the three colors used to produce the camouflage pattern in fabric sample number two never converge even at wavelengths up to 1800 nm. Comparing FIG. 2 to FIG. 3 illustrates how a camouflage pattern substantially the same as a camouflage pattern used in the past can be produced according to the present disclosure while still maintaining color separation at longer wavelengths in the infrared region.

EXAMPLE 2

Another fabric sample made in accordance with the present disclosure was produced and tested for reflectance. In this example, the same fabric described in Example 1 was used. In this example, however, a camouflage pattern adapted for desert wear was applied to the fabric. The camouflage pattern contained four colors: highland, light coyote, urban tan and light tan. The low reflectance dye was incorporated into the highland color, the light coyote, and the urban tan color in different concentrations. The low reflectance dye used was CI vat black 19 dye obtained from Dystar LP under the trade name INDANTHREN GREY NC. The following vat dyes were blended to produce the four colors.

Highland 16.3 g/Kg Indanthren Brown HRR (Dystar LP)

27.0 g/Kg Indanthren Grey NC (Dystar LP)

24.0 g/Kg Roycevat Yellow CM (Passaic Color & Chemical)

Lt Coyote 5.8 g/Kg Indanthren Orange GRA (Dystar LP)

10.9 g/Kg Indanthren Grey NC (Dystar LP)

14.0 g/Kg Roycevat Brown GS (Passaic Color & Chemical)

0.96 g/Kg Roycevat Yellow CM (Passaic Color & Chemical)

Urban Tan 1.75 g/Kg Indanthren Brown HRR (Dystar LP)

2.55 g/Kg Isovat Brown LBG (Monomer Chemical Industries Pvt. Ltd.)

5.7 g/Kg Indanthren Grey NC (Dystar LP)

0.3 g/Kg Roycevat Yellow CM (Passaic Color & Chemical)

Lt Tan 0.47 g/Kg Brown HRR (Dystar LP)

0.22 g/Kg Indanthren Blue TCLF (Dystar LP)

0.56 g/Kg Roycevat Olive R (Passaic Color & Chemical)

After the fabric sample was produced, the sample was tested for reflectance at wavelengths from 400 nm to 1800 nm. The following results were obtained which are also graphically illustrated in FIG. 4.

Figure 4:
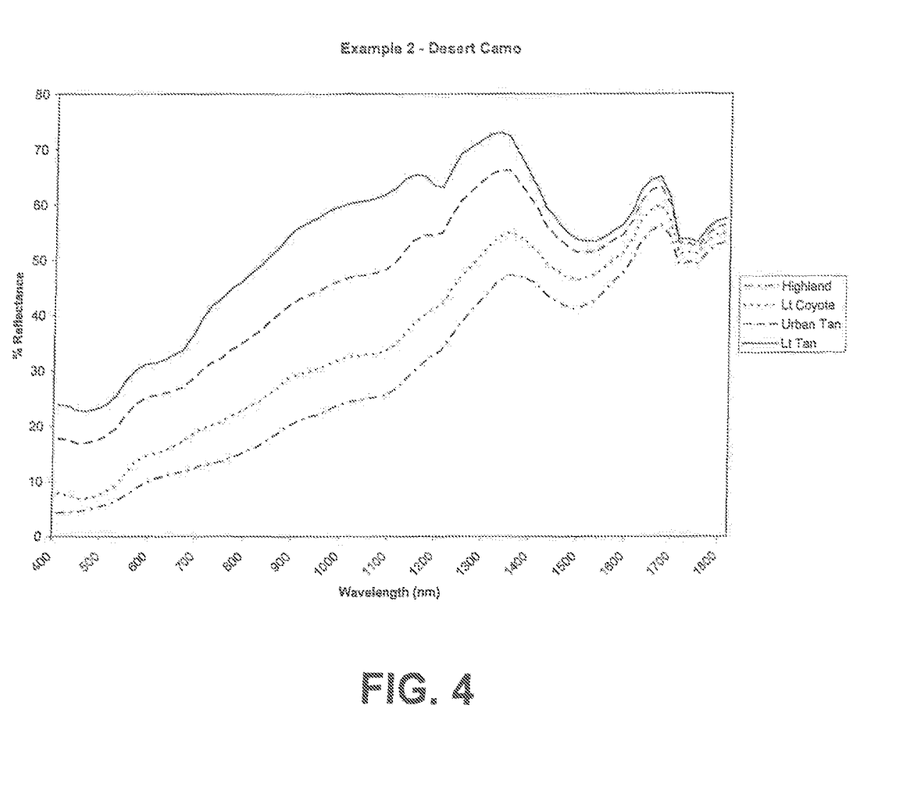

| Wavelength (nm) | Reflectance of Highland (%) | Reflectance of Light Coyote (%) | Reflectance of Urban Tan (%) | Reflectance of Light Tan (%) |
| --- | --- | --- | --- | --- |
| 400 | 4.27 | 7.99 | 17.7 | 23.76 |
| 500 | 5.64 | 8.16 | 18.1 | 23.84 |
| 600 | 10.4 | 14.96 | 25.49 | 31.33 |
| 700 | 12.83 | 19.44 | 30.2 | 39.49 |
| 800 | 15.68 | 23.62 | 36.16 | 47.8 |
| 900 | 20.82 | 29.35 | 42.89 | 55.98 |
| 1000 | 24.18 | 32.35 | 46.63 | 60.11 |
| 1100 | 26.34 | 34.42 | 49.5 | 62.92 |
| 1200 | 33.54 | 41.83 | 54.94 | 63.12 |
| 1300 | 44.45 | 52.67 | 65.48 | 72.79 |
| 1400 | 45.57 | 51.61 | 59.29 | 63.12 |
| 1500 | 41.69 | 46.6 | 51.34 | 53.38 |
| 1600 | 50.08 | 53.71 | 56.98 | 58.81 |
| 1700 | 49.15 | 51.13 | 53.07 | 53.79 |
| 1800 | 53.18 | 54.86 | 56.39 | 57.47 |

As shown in FIG. 4, all four colors contained in the desert camouflage pattern had separate reflectances over the wavelength range from 400 nm to 1800 nm.

EXAMPLE 3

Example number 2 above was repeated using a very similar desert camouflage pattern. In this example, however, the concentration of the vat dyes was slightly altered as follows:

Highland 23.7 g/Kg Indanthren Brown HRR (Dystar LP)

35.8 g/Kg Indanthren Grey NC (Dystar LP)

23.5 g/Kg Roycevat Yellow CM (Passaic Color & Chemical)

Lt Coyote 5.5 g/Kg Indanthren Orange GRA (Dystar LP)

10.5 g/Kg Indanthren Grey NC (Dystar LP)

12.9 g/Kg Roycevat Brown GS (Passaic Color & Chemical)

0.75 g/Kg Roycevat Yellow CM (Passaic Color & Chemical)

Urban Tan 1.47 g/Kg Indanthren Brown HRR (Dystar LP)

2.3 g/Kg Isovat Brown LBG (Monomer Chemical Industries Pvt. Ltd.)

4.7 g/Kg Indanthren Grey NC (Dystar LP)

Lt Tan 0.47 g/Kg Indanthren Brown HRR (Dystar LP)

0.22 g/Kg Indanthren Blue TCLF (Dystar LP)

0.56 g/Kg Roycevat Olive R (Passaic Color & Chemical)

As shown above, a low reflectance dye was included in the highland color, the light coyote color, and the urban tan color.

Figure 5:
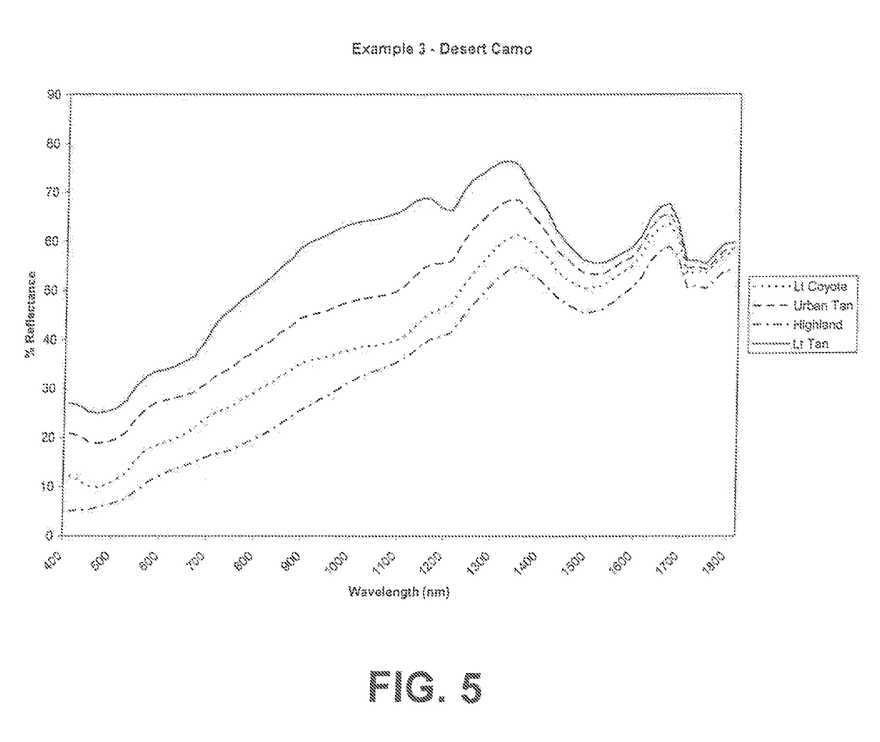

The fabric was tested for reflectance and the following results were obtained (graphically illustrated in FIG. 5):

| Wavelength (nm) | Reflectance of Light Coyote (%) | Reflectance of Urban Tan (%) | Reflectance of Highland (%) | Reflectance of Light Tan (%) |
| --- | --- | --- | --- | --- |
| 400 | 12.33 | 20.91 | 5.09 | 27 |
| 500 | 11.47 | 19.74 | 6.87 | 26.02 |
| 600 | 19.02 | 27.65 | 12.82 | 33.95 |
| 700 | 24.8 | 32.27 | 16.57 | 42.73 |
| 800 | 30.04 | 38.7 | 20.34 | 51.24 |
| 900 | 35.74 | 44.99 | 26.41 | 59.81 |
| 1000 | 38.31 | 48.07 | 32.06 | 63.87 |
| 1100 | 40.7 | 50.95 | 36.14 | 66.71 |
| 1200 | 47.34 | 55.99 | 41.39 | 66.22 |
| 1300 | 59.31 | 67.42 | 52.69 | 76.04 |
| 1400 | 56.89 | 61.61 | 51.01 | 66.18 |
| 1500 | 50.69 | 53.28 | 45.71 | 55.57 |
| 1600 | 57.25 | 59.23 | 52.6 | 61 |
| 1700 | 53.31 | 54.55 | 50.6 | 56.1 |
| 1800 | 57.59 | 58.49 | 54.32 | 59.7 |

EXAMPLE 4

In this example, a camouflage pattern in accordance with the present disclosure was applied to a fire resistant fabric. The fabric was made from yarns containing 65 percent by weight fire resistant rayon fibers, 25 percent by weight para-aramid fibers, and 10 percent by weight nylon fibers. The fabric had a rip-stop weave and had a basis weight of about 6.5 ounces per square yard.

The camouflage pattern applied to the fabric was for desert environments and included four colors: highland, light coyote, urban tan, and light tan. The follow vat dyes were used to produce the four colors.

Highland
37.2 g/Kg Indanthren Brown HRR (Dystar LP)
54.7 g/Kg Indanthren Grey NC (Dystar LP)
25.95 g/Kg Roycevat Yellow CM (Passaic Color & Chemical)

Lt Coyote
10.2 g/Kg Indanthren Orange GRA (Dystar LP)
20.6 g/Kg Indanthren Grey NC (Dystar LP)
17.86 g/Kg Roycevat Brown BRG (Passaic Color & Chemical)
1.0 g/Kg Roycevat Yellow CM (Passaic Color & Chemical)

Urban Tan
4.0 g/Kg Indanthren Brown HRR (Dystar LP)
1.5 g/Kg Indanthren Grey NC (Dystar LP)
5.0 g/Kg Indanthren Blue TCLF (Dystar LP)
0.51 g/Kg Patcovat Red 3B (C.H. Patrick & Co., Inc.)

Lt Tan
1.36 g/Kg Indanthren Brown HRR (Dystar LP)
2.39 g/Kg Indanthren Blue TCLF (Dystar LP)
0.36 g/Kg Patcovat Olive TPC (C.H. Patrick & Co., Inc.)
3.8 g/Kg Navinon Violet BNN (Sunbelt Corporation)

As shown above, a low reflectance dye was added to the highland color, the light coyote color, and the urban tan color. The fabric sample was tested for reflectance and the following results were obtained:

| Wavelength (nm) | Reflectance of Light Coyote (%) | Reflectance of Urban Tan (%) | Reflectance of Highland (%) | Reflectance of Light Tan (%) |
|---|---|---|---|---|
| 400 | 6.34 | 12.11 | 3.83 | 16.43 |
| 500 | 12.29 | 21.53 | 8.02 | 34.37 |
| 600 | 20.99 | 27.34 | 14.5 | 39.39 |
| 700 | 26.47 | 47.95 | 18.18 | 56.66 |
| 800 | 31.67 | 65.34 | 22.56 | 67.87 |
| 900 | 37.98 | 70.79 | 28.32 | 73.51 |
| 1000 | 41.04 | 74.01 | 31.1 | 76.02 |
| 1100 | 44.08 | 76.49 | 33.66 | 77.98 |
| 1200 | 48.62 | 73.66 | 39.47 | 74.31 |
| 1300 | 57.76 | 78.74 | 49.37 | 78.74 |
| 1400 | 55.04 | 67.85 | 49.09 | 67.42 |
| 1500 | 48.82 | 57.12 | 44.56 | 56.44 |
| 1600 | 56.06 | 61.9 | 52.91 | 61.03 |
| 1700 | 56.04 | 60.13 | 54.3 | 59.49 |
| 1800 | 58.19 | 61.56 | 56.75 | 60.68 |

Figure 6:
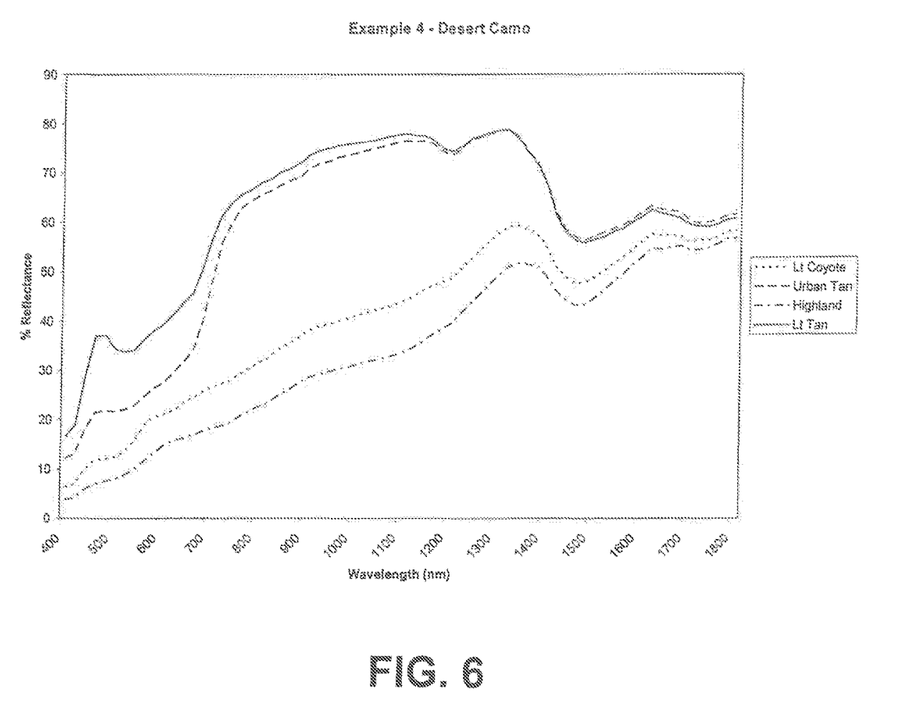

The above results are also illustrated graphically in FIG. 6. As shown in FIG. 6, although the light tan and urban tan colors begin to merge at 1200 nm, the remaining colors had much different and distinct reflectances through to 1800 nm.

EXAMPLE 5

In this example, the fabric described in example number 1 above was printed with a camouflage pattern particularly adapted for woodland environments. The camouflage pattern included four colors: black, green, coyote and khaki. The colors of the camouflage pattern were produced from the following dyes.

Black
130.0 g/Kg Econovat Black CLG (Southern Dye & Chemical)
50.0 g/Kg Patcovat Black PCB (C.H. Patrick & Co., Inc.)
39.0 g/Kg Chroma Black NGB (Chroma International)
30.0 Printrite 594 (Neowin Textile Chemicals Co. Ltd.)

Green
1.58 g/Kg Roycevat Jade Green Quad (Passaic Color & Chemical)
28.35 g/Kg Roycevat Yellow CM (Passaic Color & Chemical)
65.55 g/Kg Idanthren Grey NC (Dystar LP)
3.04 g/Kg Patcovat Black PCB (C.H. Patrick & Co., Inc.)

Coyote
11.38 g/Kg Indanthren Brown HRR (Dystar LP)
17.0 g/Kg Indanthren Grey NC (Dystar LP)
20.12 g/Kg Roycevat Yellow CM (Passaic Color & Chemical)

Khaki
0.986 g/Kg Roycevat Yellow CM (Passaic Color & Chemical)
2.9 g/Kg Roycevat Jade Green Quad (Passaic Color & Chemical)
8.53 g/Kg Brown HRR (Dystar LP)
0.84 g/Kg Indanthren Blue TCLF (Dystar LP)

As shown above, a low reflectance dye was used to create the green color and the coyote color.

The fabric sample was tested for reflectance and the following results were obtained:

| Wavelength (nm) | Reflectance of Khaki 475 (%) | Reflectance of Coyote 476 (%) | Reflectance of Green 474 (%) | Reflectance of Black 477 (%) | Reflectance of Coyote 50139 (%) | Reflectance of Green 50139 (%) |
|---|---|---|---|---|---|---|
| 400 | 8.83 | 5.28 | 3.66 | 2.96 | 6.56 | 4.03 |
| 500 | 10.13 | 7.46 | 5.83 | 2.96 | 8.29 | 6.89 |
| 600 | 14.54 | 13 | 6.2 | 2.78 | 15.01 | 7.09 |
| 700 | 18.97 | 16.6 | 6.34 | 3.76 | 21.99 | 8.39 |
| 800 | 53.43 | 26.04 | 9.59 | 5.14 | 35.78 | 17.88 |
| 900 | 71.01 | 32.41 | 13.2 | 6.02 | 46.65 | 27.07 |
| 1000 | 76.59 | 34.22 | 14.26 | 6.55 | 51.43 | 31.54 |
| 1100 | 79.29 | 35.39 | 15.03 | 6.84 | 53.44 | 33.75 |
| 1200 | 69.79 | 41.79 | 20.08 | 7.46 | 56.26 | 39.64 |
| 1300 | 79.02 | 53.44 | 29.13 | 8.07 | 67.34 | 49.98 |
| 1400 | 67.65 | 52.6 | 32.58 | 9.13 | 60.76 | 50.36 |
| 1500 | 55.99 | 47.68 | 32.37 | 10.05 | 52.01 | 45.64 |
| 1600 | 60.14 | 54.9 | 42.61 | 11.39 | 58.03 | 53 |
| 1700 | 55.34 | 52.94 | 45.32 | 12.61 | 54.74 | 52.19 |
| 1800 | 58.71 | 56.92 | 49.69 | 13.33 | 57.8 | 55.48 |

Figure 7:
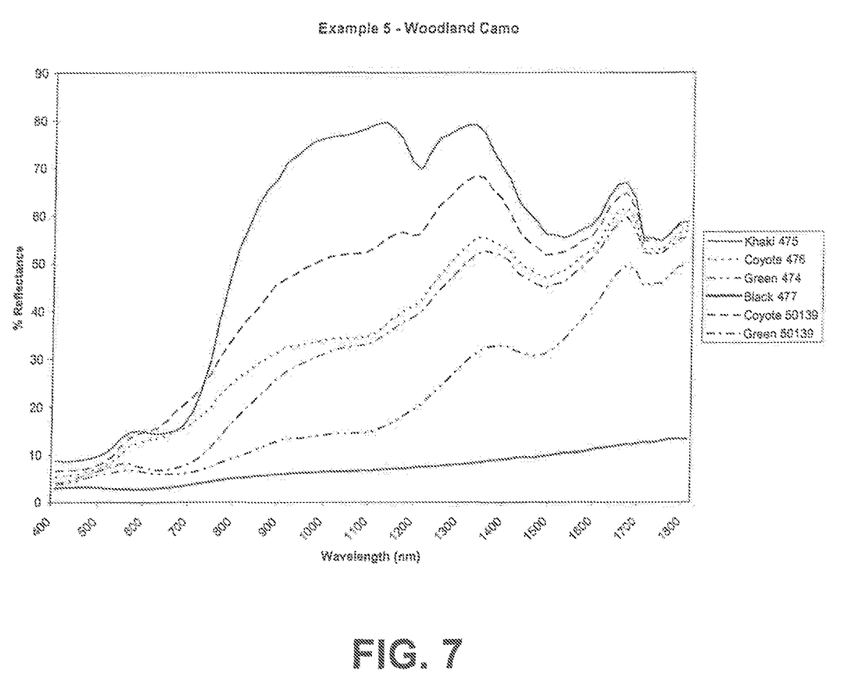

The results are also graphically illustrated in FIG. 7.

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the disclosure so further described in such appended claims.

What is claimed:

1. A fabric product comprising:
   a fabric substrate having a first side and a second and opposite side; and
   a camouflage pattern visible from the first side of the fabric substrate, the camouflage pattern comprising
     at least a first color, a second color, and a third color, the first, second, and third colors in the camouflage pattern being formed from a plurality of vat dyes blended together, the plurality of vat dyes blended together having a different chemical structure,
     at least the first color and the third color containing a low reflectance dye that has a reflectance of less than 70 percent at a wavelength of 1500nm, the low reflectance dye being present in the first color at a higher concentration than in the third color,
     the dye being present in the first color and the third color so that the first color and the third color have a reflectance that is at least 5% different than the reflectance of the second color at a wavelength of 1500 nm.

2. The fabric product as defined in claim 1, wherein the low reflectance dye comprises a thiazine.

3. The fabric product as defined in claim 1, wherein the low reflectance dye comprises C.I. vat black dye 19.

4. The fabric product as defined in claim 1, wherein the first color has a reflectance that is at least 5 percent different than the second color at a wavelength of 1500 nm after the fabric substrate has been subjected to 20 laundry cycles.

5. The fabric product as defined in claim 1, wherein the fabric substrate comprises a woven fabric containing cellulose fibers.

6. The fabric product as defined in claim 5, wherein the fabric substrate contains a blend of polyamide fibers and cellulose fibers, the cellulose fibers comprising cotton fibers.

7. The fabric product as defined in claim 5, wherein the cellulose fibers comprise rayon fibers.

8. The fabric product as defined in claim 7, wherein the fabric substrate is fire retardant and contains fire retardant rayon fibers and aramid fibers.

9. The fabric product as defined in claim 1, wherein the fabric substrate comprises a woven fabric having a basis weight of from about 6 ounces per square yard to about 8 ounces per square yard.

10. The fabric product as defined in claim 1, wherein the first color has a reflectance that is at least 10 percent different than the reflectance of the second color at a wavelength of 1500 nm.

11. The fabric product as defined in claim 1, wherein the camouflage pattern is comprised of from 4 colors to 8 colors.

12. The fabric product as defined in claim 1, wherein the first color has a reflectance that is at least 5 percent different than the reflectance of the second color over a wavelength range of from 600 nm to 1600 nm.

13. The fabric product as defined in claim 1, wherein the low reflectance dye has a reflectance of less than 65 percent at a wavelength of 1500 nm.

14. The fabric product as defined in claim 1, wherein the low reflectance dye has a reflectance of less than 60 percent at a wavelength of 1500 nm.

15. The fabric product as defined in claim 1, wherein the camouflage pattern includes a black color, a green color, a dark brown color, and a light brown color, the low reflectance dye being present in the green color and the dark brown color.

16. The fabric product as defined in claim 1, wherein the camouflage pattern includes a green color, a grey color, and a brown color, the low reflectance dye being present in the green color and the grey color.

17. The fabric product as defined in claim 1, wherein the camouflage pattern includes the colors highland, light coyote, urban tan, and light tan, the low reflectance dye being present in the light coyote color and the urban tan color.

18. A combat garment made from the fabric substrate defined in claim 1.

19. The fabric product as defined in claim 1, wherein the fabric substrate comprises a woven fabric containing cellulose fibers, the woven fabric having a basis weight of from about 6 ounces per square yard to about 8 ounces per square yard, the camouflage pattern including from 4 to 8 colors, the low reflectance dye comprising a thiazine, the low reflectance dye having a reflectance of less than 60 percent at 1500 nm, the first color having a reflectance that is at least 5 percent different than the reflectance of the second color at a wavelength range of from 600 nm to 1600 nm.

20. The fabric product as defined in claim 1, wherein the first color has a lower reflectance than the third color.

* * * * *